United States Patent
László

(10) Patent No.: US 9,366,288 B2
(45) Date of Patent: Jun. 14, 2016

(54) BEARING ARRANGEMENT WITH TWO AXIALLY ACTING SPRING SYSTEMS

(71) Applicant: Gergely László, Esslingen-Berkheim (DE)

(72) Inventor: Gergely László, Esslingen-Berkheim (DE)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/388,354

(22) PCT Filed: Mar. 13, 2013

(86) PCT No.: PCT/EP2013/000748
§ 371 (c)(1),
(2) Date: Sep. 26, 2014

(87) PCT Pub. No.: WO2013/143655
PCT Pub. Date: Oct. 3, 2013

(65) Prior Publication Data
US 2015/0049974 A1    Feb. 19, 2015

(30) Foreign Application Priority Data
Mar. 26, 2012    (DE) .......................... 10 2012 005932

(51) Int. Cl.
*F16C 27/04*    (2006.01)
*B62D 5/04*    (2006.01)
(Continued)

(52) U.S. Cl.
CPC .............. *F16C 27/04* (2013.01); *B23P 15/003* (2013.01); *B62D 5/0448* (2013.01); *F16C 25/083* (2013.01); *F16C 35/077* (2013.01); *F16C 43/04* (2013.01); *F16H 25/12* (2013.01);
(Continued)

(58) Field of Classification Search
CPC .. F16C 25/083; F16C 2326/24; B62D 5/0448
See application file for complete search history.

(56) References Cited

U.S. PATENT DOCUMENTS

| | | | | |
|---|---|---|---|---|
| 2013/0206498 A1* | 8/2013 | Froehlich | ............. | B62D 5/0448 180/444 |
| 2013/0248279 A1* | 9/2013 | Rupp | ................... | B62D 5/0448 180/444 |
| 2014/0224567 A1* | 8/2014 | Kiforiuk | ............. | B62D 5/0448 180/444 |

FOREIGN PATENT DOCUMENTS

| | | |
|---|---|---|
| DE | 102007042802 A1 | 3/2009 |
| DE | 102010029266 A1 | 12/2011 |

(Continued)

OTHER PUBLICATIONS

German Language International Search Report for International patent application No. PCT/EP2013/000748; mailing date Jul. 4, 2013.
(Continued)

*Primary Examiner* — Thomas R. Hannon
(74) *Attorney, Agent, or Firm* — thyssenkrupp North America, Inc.

(57) ABSTRACT

A bearing arrangement may involve two spring systems that are decoupled from one another. Some bearing arrangements may include components such as a bearing housing, a bearing, spring elements for supporting the bearing in the housing, and an abutment that can be moved in an axial direction of the bearing. Further, a method for assembling a bearing arrangement may involve a compensation mechanism having dimensions that can be subsequently adapted.

9 Claims, 2 Drawing Sheets

(51) Int. Cl.
*F16C 35/077* (2006.01)
*F16H 25/24* (2006.01)
*F16C 25/08* (2006.01)
*B23P 15/00* (2006.01)
*F16C 43/04* (2006.01)
*F16H 25/12* (2006.01)
*F16H 25/22* (2006.01)
*F16C 19/06* (2006.01)

(52) U.S. Cl.
CPC ............... *F16H 25/24* (2013.01); *F16C 19/06* (2013.01); *F16H 25/2204* (2013.01); *Y10T 29/49679* (2015.01)

(56) References Cited

FOREIGN PATENT DOCUMENTS

DE 102010029767 A1 12/2011
DE 102010038715 A1 2/2012

OTHER PUBLICATIONS

English Translation of International Search Report for International patent application No. PCT/EP2013/000748; mailing date Jul. 4, 2013.
English translation of abstract of DE 102007042802 (A1).
English translation of abstract of DE 102010038715 (A1).
English translation of abstract of DE 102010029767 (A1).
English translation of abstract of DE 102010029266 (A1).

\* cited by examiner

BEARING ARRANGEMENT WITH TWO AXIALLY ACTING SPRING SYSTEMS

CROSS REFERENCE TO RELATED APPLICATIONS

This application is a U.S. National Stage Entry of International Patent Application Serial Number PCT/EP2013/000748, filed Mar. 13, 2013, which claims priority to German patent application no. 102012005932.9, filed Mar. 26, 2012.

FIELD

The invention relates to a bearing arrangement and to a method for producing a bearing arrangement.

BACKGROUND

Bearing arrangements, in particular bearing arrangements in steering systems for motor vehicles, are subject to external influences. Such influences originate on the one hand from the vehicle, specifically as a result of actuation of the steering arrangement by means of a steering wheel, because the mounted components are moved as a result of the steering movement. On the other hand, the bearings are subjected, by the roadway surface, to shocks, vibrations, oscillations and the like which are transmitted into the bearing via the steering system.

Bearings are therefore normally equipped with damping devices in order that, firstly, durability is ensured and, secondly, rattling noises caused by the bearing can be prevented. Such damping devices may act in an axial direction and in a radial direction.

For example, DE 10 2010 029 266 has disclosed a recirculating ball gear which has an axially damped bearing. The spring elements described in said document are arranged between a bearing housing and the bearing, wherein the spring elements are directly connected to a bearing outer ring or bearing inner ring. This however yields the disadvantage that the spring forces required for the damping of the bearing cancel one another out, with damping only of the axially acting forces being realized.

Furthermore, bearings are predominantly installed as a whole in bearing arrangements, for example for ball screw mechanisms, for which reason it is necessary to calculate tolerances already at the planning stage, which tolerances are therefore extremely large.

SUMMARY

It is therefore an object of the invention to further develop and provide a bearing arrangement of the type mentioned in the introduction, in which bearing arrangement the two spring forces do not cancel one another out, and also to propose a method for producing a bearing arrangement, by which method the tolerances can be reduced to a minimum.

DETAILED DESCRIPTION

Figure 1:
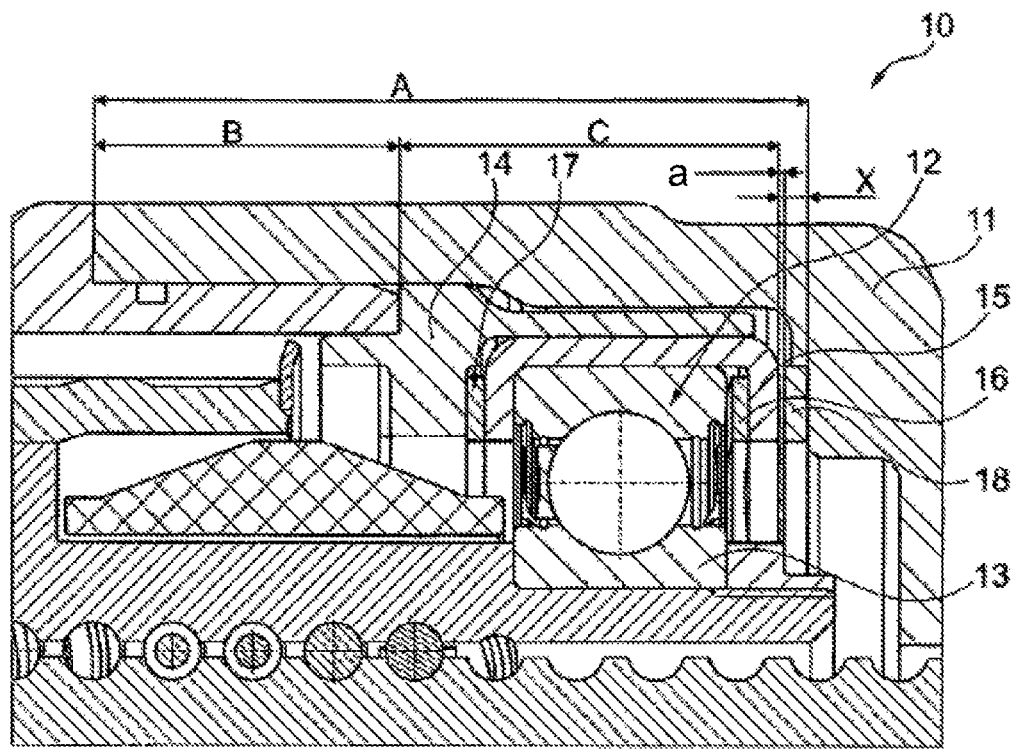
FIG. 1 is a sectional view of an embodiment of a bearing arrangement having a damping device, as disclosed herein.

In an embodiment of the present disclosure, a bearing arrangement, in particular for a ball screw mechanism, includes a bearing which is supported with respect to a bearing housing, wherein spring elements are arranged between a housing and the bearing, having at least one abutment which is movable in an axial direction of the bearing.

In a preferred embodiment of the invention, it may be provided that the abutment at least partially surrounds the bearing, wherein, in particular, a bearing outer ring and a bearing inner ring are arranged within the abutment.

Furthermore, in one refinement of the invention, it may be provided that at least one first spring element provided for the axial support of the bearing is arranged indirectly and/or directly between the abutment and the housing.

It is advantageously possible for the first spring element to force the abutment against the housing in the axial direction of the bearing.

It is likewise possible, in a likewise preferred refinement of the invention, for at least one second spring element provided for the axial support of the bearing to be arranged between the abutment and the bearing.

It may advantageously be provided here that the second spring element forces the bearing in the axial direction against the abutment at the inner side.

In another refinement, it is possible for a compensation means, in particular a tolerance disk, to be provided on a side situated opposite the first spring element, wherein, in particular, the abutment is forced against the tolerance disk.

In a preferred embodiment, the tolerance disk may be arranged with play in an intermediate space between the abutment and the housing.

In a further advantageous embodiment, the abutment may circumferentially surround at least one bearing outer ring in substantially U-shaped form, wherein contact regions between the spring elements and the abutment are provided in the region of the bearing outer ring.

A method for achieving the object has the features of independent claim 10. According to said claim there is proposed a method for producing a bearing arrangement, comprising at least one bearing, a bearing housing and spring elements for the axial support of the bearing, having the method steps:

a) a first spring element is inserted into the housing,
b) into a sleeve formed as an abutment there is inserted the bearing with bearing outer ring, as a block, and a second spring element,
c) the combination of sleeve, bearing and spring element is inserted as a block into the housing,
d) a compensation means is inserted into the housing between the sleeve and the housing.

In a preferred embodiment, the compensation means can be adapted to tolerances of the further components.

In particular, it may be provided that, during the production process, the further components are measured and provided with a marking, for example in the form of a data matrix code, wherein the dimension is recorded in the marking, and that, during the assembly process, the compensation means is selected from a store of compensation elements of different dimensions such that, during assembly with the further components, a predetermined value for the installation tolerance is obtained can be adapted. Here, it is for example possible for the compensation elements to be selected in steps of 0.1 mm.

An exemplary embodiment will be explained in more detail below with reference to the drawing figures of the present disclosure.

The bearing arrangement is part of a steering arrangement (not otherwise illustrated) of a motor vehicle. In the steering arrangement there is provided a threaded spindle on which a ball nut is arranged. The bearing arrangement 10 is seated on the ball nut, wherein the bearing arrangement 10 supports the ball nut with respect to a housing 11. A housing 11 thus at least partially surrounds the bearing arrangement 10 and the ball nut. By rotation of the ball nut, the threaded spindle can be moved in an axial direction, or by rotation of the threaded spindle, the ball nut can be displaced on the threaded spindle.

Via a connection of the steering arrangement and via wheels of the vehicle, the steering arrangement is in contact with a roadway to be travelled on, as a result of which shocks, vibrations or the like are also transmitted into the steering system. In this way, shocks are also transmitted in an axial direction to the threaded spindle, and likewise to the ball nut and the bearing arrangement 10.

The bearing arrangement has a bearing with a bearing outer ring 12 and a bearing inner ring 13, wherein the bearing is supported with respect to the housing 11. To receive the bearing, the housing has a recess region in which the bearing is at least partially arranged with a sleeve 14. The bearing itself is surrounded by an intermediate sleeve 15 formed as an abutment, for which reason the recess region is dimensioned accordingly.

The abutment 15 circumferentially surrounds the bearing and lies at least partially against the bearing outer ring 12 in the region thereof. An inner diameter therefore corresponds approximately to an outer diameter of the bearing. The intermediate sleeve 15 has, corresponding to the bearing, at least one central opening through which the ball screw mechanism and the ball nut can extend.

Figure 2:
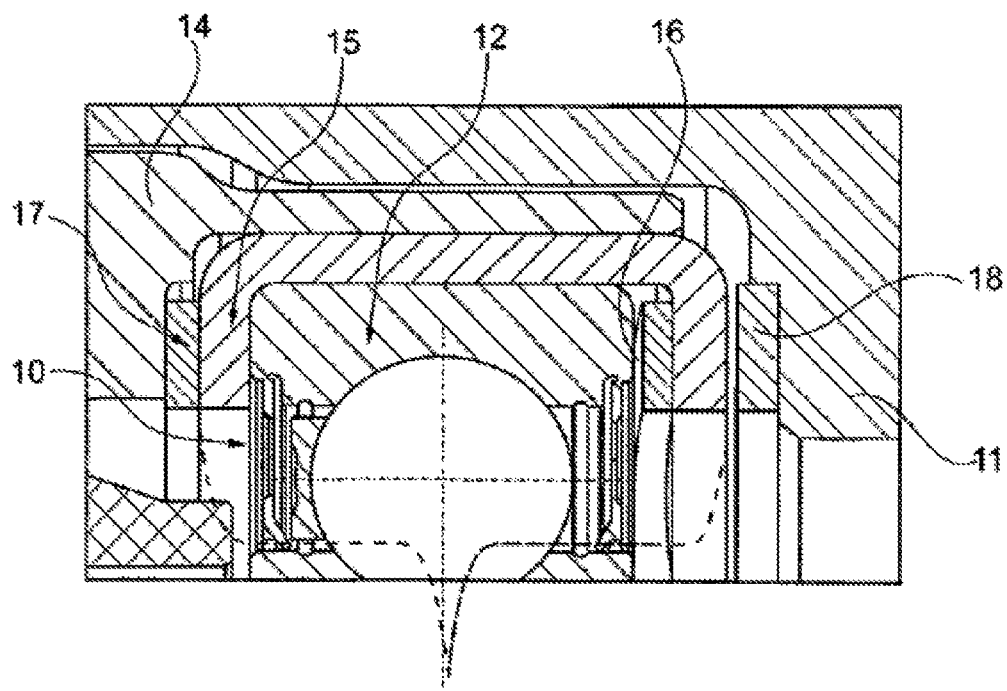
FIG. 2 is a detail view of a portion of the bearing arrangement of FIG. 1.
Figure 4:
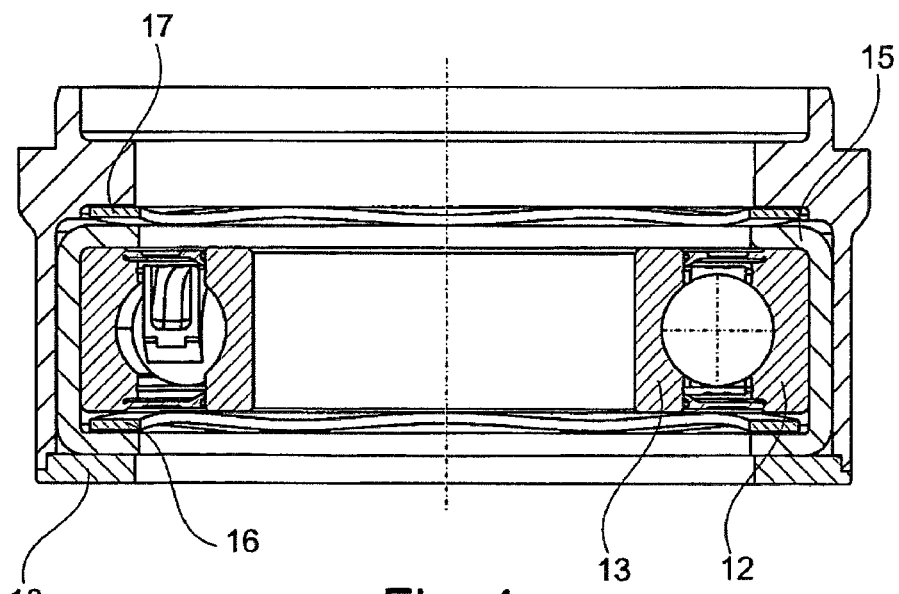
FIG. 4 is a sectional view of an embodiment of a bearing of the present disclosure.

Likewise arranged within the intermediate sleeve is a second spring element 16 which is provided between the bearing and the abutment. Said second spring element supports the bearing with respect to the abutment. Therefore, the abutment, in the form of the intermediate sleeve 15, is dimensioned correspondingly to a width made up of bearing, spring element 16 and a spring travel of the spring element 16. The corresponding width is indicated in FIG. 2 in which an internal region of the intermediate sleeve 15 has space for the bearing and the spring element plus corresponding spring travel. The second spring element 16 extends over the entire width of the bearing, as illustrated in FIG. 4. Here, in the region of the bearing outer ring 12, there is a first contact region between the second spring element 16 and the abutment. Slightly further toward a center of the bearing, there is a first contact region between the spring element and the bearing, as illustrated in FIG. 4. Further contact regions or points are conceivable and provided.

On an outer side of the abutment 15, the intermediate sleeve is supported with respect to the housing and/or the sleeve 14. Depending on the embodiment of the bearing arrangement, the sleeve 14 may or may not be provided. If no such sleeve 14 is provided, the intermediate sleeve is supported directly with respect to the housing by way of a first spring element 17. There would otherwise be only indirect support by way of the first spring element 17 via the sleeve 14. A corresponding space is provided for the arrangement of the first spring element 17 between the intermediate sleeve 15 and the housing 11 or the sleeve 14, wherein said space corresponds to a width of the first spring element 17 plus a spring travel thereof. The first spring element 17 is of the same design as the second spring element, as a result of which the contact regions with the components to be supported in a radial direction of the bearing are the same.

The first spring element 17 is arranged on an outer side of the abutment 15, said outer side being situated opposite an inner side of the abutment 15 on which the second spring element 16 is provided. In this respect, the two spring elements 16, 17 surround the bearing or the bearing outer ring 12 at both sides in the axial direction.

On an outer side, situated opposite the first spring element 17, of the intermediate sleeve 15 there is provided a compensation means in the form of a tolerance disk 18, which is fitted in an intermediate space between abutment and housing. The tolerance disk 18 forms a potential abutment surface with the abutment 15 in an upper region situated in the region of the bearing outer ring 12. The intermediate space is dimensioned so as to be wider than the width of the tolerance disk; in particular, a gap a as illustrated in FIG. 2 between tolerance disk 18 and the intermediate sleeve 15 corresponds to a spring travel of the first spring element 17.

Said gap a is however present only if the abutment 15 is forced against the first spring element 17 by external action. The first spring element which is otherwise of undulating form is illustrated in FIG. 2 as being flat (see also FIG. 3, "left" illustration). The bearing is thus supported against the sleeve 14 and/or against the housing 11 via the abutment 15 and the first spring element 17.

Figure 3:
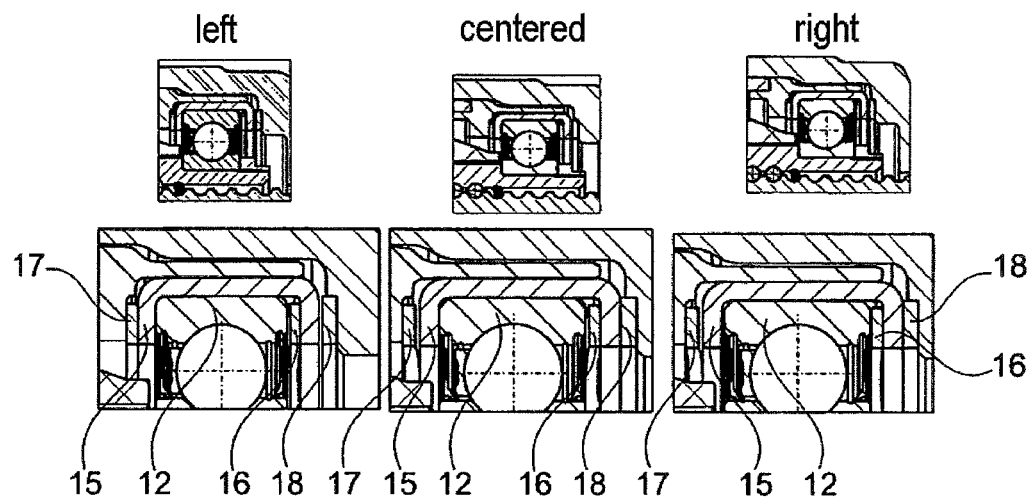
FIG. 3 shows different positions of the damping device in an embodiment of a bearing of the present disclosure.

When the bearing is in a rest or initial position, the intermediate sleeve 15 lies against the tolerance disk 18 in a sealing position, as shown in FIG. 3 in the "centered" and "right" illustrations. From these it can also be seen that the gap a is small and substantially corresponds in fact to the spring travel of the first spring element 17.

In the rest or initial position, the second spring element 16 is also of undulating form, such that the bearing can be held in a stable manner in one position within the intermediate sleeve 15. In said position, the bearing is arranged, in a sealing position, against an inner side, situated opposite the second spring element 16, of the intermediate sleeve 15, as a result of which said bearing is arranged in stable fashion in the abutment 15.

In the position of the bearing shown in FIG. 3 in the "right" illustration, the intermediate sleeve 15 is forced at one side against the tolerance disk 18 and, at the other side, the bearing within the intermediate sleeve 18 is forced against the second spring element 16, as a result of which said second spring element lies flat against the corresponding inner side of the abutment 15. On the opposite inner side, in said position, an intermediate space is formed between the bearing and the intermediate sleeve 15, which intermediate space substantially corresponds in terms of its width to the spring travel of the second spring element 16.

It is thus clear that, on the one hand, the bearing is arranged movably in the axial direction in the intermediate sleeve 15 and, on the other hand, the intermediate sleeve 15 is arranged movably in the axial direction in the receptacle in the housing. In this way, the two spring forces of the spring elements 16, 17 acting on the bearing are decoupled from one another. It must however be ensured that the gap a is provided on the outer side, situated opposite the first spring element 17, of the intermediate sleeve 15, and thus the tolerance disk must not be overdimensioned.

For the production of the bearing arrangement 10, the elements described above may be installed in the bearing housing 11 at least partially in modular fashion. For the assembly process, the first spring element 17 is firstly inserted into the housing 11 or into the sleeve 14. The intermediate sleeve 15 can separately be assembled with the bearing and the second spring element 16. The bearing in the form of the bearing outer ring 12 is inserted as a block into the intermediate sleeve 15, followed by the second spring element 16, which forces the bearing outer ring 12 against the inner side of the abutment 15. The fully assembled abutment is then placed into the receptacle adjacent to the first spring element 17, where it is pushed into a block state. This assembly process offers the advantage that the individual elements can be manufactured at different locations.

In the light of the individual measured tolerances of the respective elements and a predefined gap dimension a, the width of the tolerance disk can be individually determined. The disadvantageous liberal dimensioning of the tolerances in advance is thus dispensed with, and manufacturing and installation tolerances can therefore be better allowed for.

For this purpose, the dimension B is stored in a "data matrix code" (DMC) for the bearing housing 11, as well as the dimension A for a cover and the dimension C for a steering gear. During the assembly of the components in the production process, the actual dimensions of the components are used, and thus the dimension X for the tolerance disk 18 is defined.

A particular advantage consists in the possibility of the bearing housing 11, the cover and possibly other components that influence the installation tolerances being produced separately from one another. The components, which are possibly even produced at different manufacturing locations, are then measured, and the actual dimensions are recorded in the data matrix code used for the marking of the component or in some other machine-readable label directly on the component. Then, during the assembly of the steering gear, it is possible for each dimension of the components provided for assembly to be read and for the tolerance chain to be calculated. From a store of tolerance disks 18 sorted by dimensions, it is then possible to select precisely the suitable tolerance disk that provides the assembly with the required tolerance dimension. In the case of manual manufacture, it may for example be the case that, after the required dimension of the tolerance disk 18 has been calculated, only that box in a rack in which the required tolerance disk is stored needs to be opened in order to withdraw a tolerance disk. Possible assembly errors through the use of an unsuitable tolerance disk are thus reliably avoided.

Overall, through the decoupling of the individual spring systems, a tolerance chain can be reduced in size, whereby said tolerance chain does not disadvantageously exceed the maximum admissible tolerance of the ball nut.

The invention relates to a bearing arrangement in which two spring systems are decoupled from one another. The invention also relates to a method for the assembly of a bearing arrangement in which a compensation means can be retroactively dimensioned.

The invention claimed is:

1. A bearing arrangement for a ball screw mechanism, the bearing arrangement comprising:
   a bearing housing;
   a bearing supported within said bearing housing;
   a plurality of spring elements disposed between said housing and said bearing and configured to support said bearing within said bearing housing;
   an abutment moveable in an axial direction of the bearing; and
   wherein said abutment at least partially surrounds said bearing, and wherein said bearing comprises a bearing outer ring and a bearing inner ring disposed within said abutment.

2. The bearing arrangement of claim 1, wherein said abutment is substantially U-shaped and circumferentially surrounds at least one bearing outer ring, and wherein said plurality of spring elements contact said abutment in a region of said bearing outer ring.

3. A bearing arrangement for a ball screw mechanism, the bearing arrangement comprising:
   a bearing housing;
   a bearing supported within said bearing housing;
   a plurality of spring elements disposed between said housing and said bearing and configured to support said bearing within said bearing housing; and
   an abutment moveable in an axial direction of the bearing, wherein said plurality of spring elements includes a first spring element disposed between said abutment and said housing and configured to provide axial support to said bearing, wherein said first spring element is configured to bias said abutment against said housing in the axial direction of the bearing.

4. The bearing arrangement of claim 3, further comprising a tolerance disk disposed on a side of said abutment that is opposite to a side of said abutment against which said first spring element acts, and wherein said abutment is biased against said tolerance disk by said first spring element.

5. The bearing arrangement of claim 4, wherein said tolerance disk is disposed in an intermediate space defined between said abutment and said housing, and wherein said tolerance disk has spatial play in said intermediate space with respect to said abutment and said housing.

6. A bearing arrangement for a ball screw mechanism, the bearing arrangement comprising:
   a bearing housing;
   a bearing supported within said bearing housing;
   a plurality of spring elements disposed between said housing and said bearing and configured to support said bearing within said bearing housing; and
   an abutment moveable in an axial direction of the bearing, wherein said plurality of spring elements includes a second spring element disposed between said abutment and said bearing, and configured to provide axial support to said bearing, wherein said second spring element is configured to bias said bearing against an inner surface of said abutment.

7. A method of producing a bearing assembly from at least one bearing, a bearing housing disposed around the at least one bearing, and a plurality of spring elements disposed within the housing and configured to support the bearing in an axial direction of the bearing, the method comprising:
   inserting a first spring into the housing;
   inserting, into a sleeve formed as an abutment, each of the bearing, having a bearing outer ring, and a second spring;
   inserting the sleeve, containing the bearing and second spring, as a single assembled component into the housing;
   inserting a compensation element into the housing between the sleeve and the housing.

8. The method of claim 7, further comprising adapting the compensation element to the dimensional tolerances of each of a plurality of components in the bearing assembly, the plurality of components including one or more of the first spring, the bearing, the second spring, and the sleeve.

9. The method of claim 8, further comprising:
   measuring at least one dimension of each of the plurality of components;

marking each of the plurality of components, said marking including at least a record of the value of the at least one measured dimension corresponding to the marked component; and selecting the compensation element from a store of compensation elements of differing dimensions such that, during assembly of the bearing assembly with each of the plurality of components, a predetermined value for the installation tolerance of the bearing assembly can be obtained.

* * * * *